United States Patent [19]
Fletcher et al.

[11] 3,952,998
[45] Apr. 27, 1976

[54] DEVICE FOR INSTALLING ROCKET ENGINES

[76] Inventors: James C. Fletcher, Administrator of the National Aeronautics and Space Administration, with respect to an invention of Thomas R. George, Jr., Thousand Oaks, Calif.

[22] Filed: Apr. 25, 1975

[21] Appl. No.: 571,821

[52] U.S. Cl. .............................. 254/124; 89/1.801; 254/93 R
[51] Int. Cl.² ...................... B66F 3/00; F41F 3/04
[58] Field of Search ................ 254/DIG. 1, DIG. 4, 254/3 R, 3 B, 3 C, 93 R, 124, 133; 89/1.815, 1 F, 1.801; 269/47, 50

[56] References Cited
UNITED STATES PATENTS 2,965,375  12/1960  Hamilton ........................ 254/93 R

FOREIGN PATENTS OR APPLICATIONS 1,002,528  10/1951  France ............................. 254/3 C
840,865    5/1939   France ............................. 89/1 F
125,413    10/1915  United Kingdom ................ 89/1 F

*Primary Examiner*—Al Lawrence Smith
*Assistant Examiner*—Robert C. Watson
*Attorney, Agent, or Firm*—W. H. Riggins; L. D. Wofford, Jr.; John R. Manning

[57] ABSTRACT

A device for installing rocket engines supported at a cant relative to vertical, an axially extensible, tiltable pedestal, a lifting platform for supporting a rocket engine at its thrust chamber exit, including a mount having a concentric base characterized by a concave bearing surface, a plurality of uniformly spaced legs extended radially from the base, and an annular receiver coaxially aligned with the base and affixed to the distal ends of said legs for receiving the thrust chamber exit. The lifting platform rests on a seat concentrically related to the pedestal and affixed to an extended end portion thereof having a convex bearing surface mated in sliding engagement with the concave bearing surface of the annular base for accommodating a rocking motion of the platform about an axis angularly related to the longitudinal axis of the pedestal, whereby excessive asymmetric loading on the thrust chamber is avoided.

6 Claims, 6 Drawing Figures

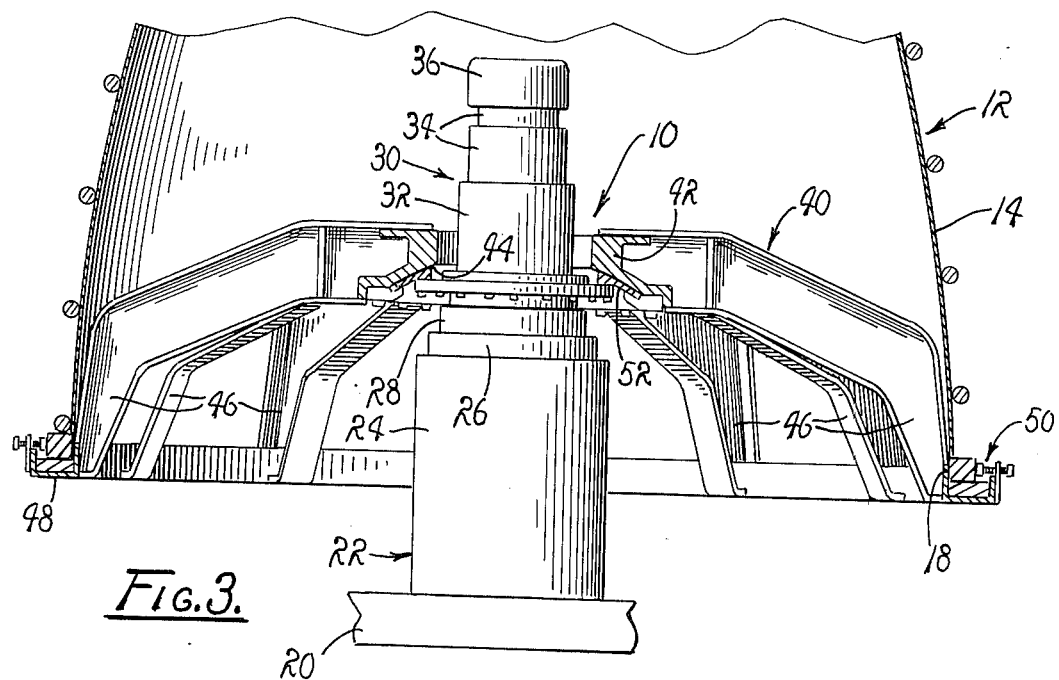
Fig. 3.
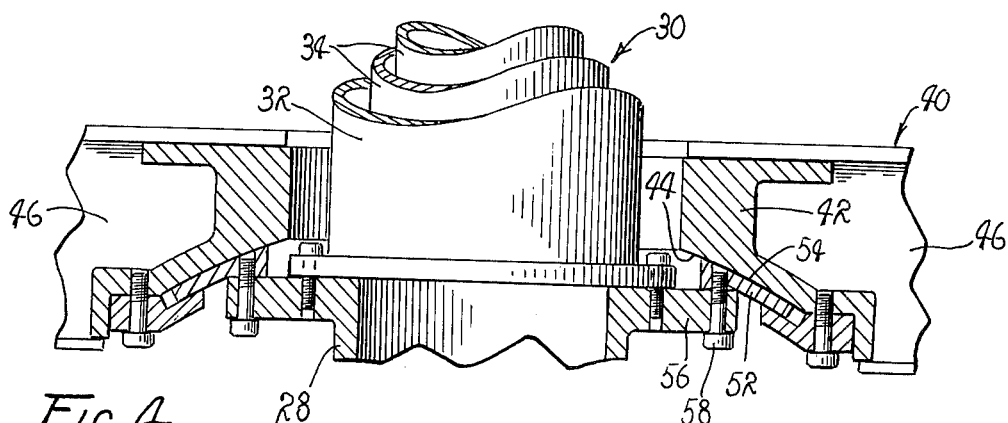
Fig. 4.
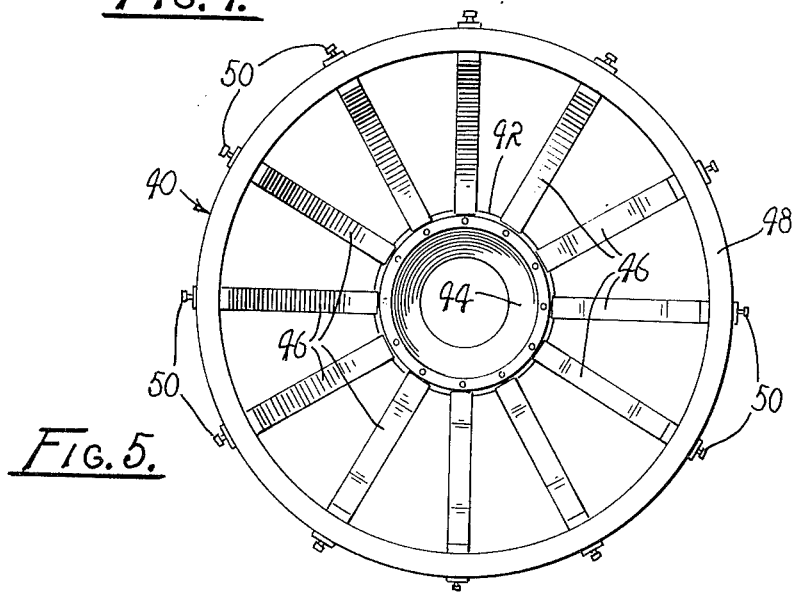
Fig. 5.
Fig. 6.

DEVICE FOR INSTALLING ROCKET ENGINES

ORIGIN OF THE INVENTION

The invention described herein was made in the performance of work under a NASA contract and is subject to the provisions of Section 305 of the National Aeronautics and Space Act of 1958, Public Law 85—568 (72 Stat. 435; 42 U.S.C. 2457).

BACKGROUND OF THE INVENTION

The invention generally relates to devices for installing rocket engines, and more particularly to a device for installing rocket engines at a severe cant relative to vertical, while maintaining uniform loading at the thrust chamber exit thereof.

Various devices have been devised for supporting rocket engines during installation procedures. Among such devices are those which include movable platforms adapted to be raised and lowered for vertical installation. When installing horizontally oriented rocket engines, installation devices equipped with a probe adapted to support an engine at its throat often are employed.

As increased thrust requirements are imposed on designers of rocket engines, there is a tendency for the engines to become larger, thus the weight of the thrust chambers necessarily is increased. Of course, there is an inherent need to accommodate engine handling without imposing weight penalties on the engines, for withstanding handling loads. For example, it is not uncommon for a rocket engine assembly to weigh in excess of 9,000 pounds while having a nozzle wall thickness of only 0.008 inches.

Difficulty in handling such engines is aggravated where the engine must be installed at a cant with respect to vertical, since excessive asymmetric loading on the engine nozzle often occurs. Consequently, there exists a need for a device having a capability for supporting a rocket engine at a canted angle, with respect to vertical, while providing for uniformed load distribution on the thrust chamber exit thereof.

It is, therefore, the general purpose of the instant invention to provide an improved device for installing rocket engines at a cant with respect to vertical, without imposing excessive asymmetric loading on the thrust chamber exit of the engine.

OBJECTS AND SUMMARY OF THE INVENTION

It is, therefore, an object of the instant invention to provide a device for installing rocket engines which overcomes the aforementioned difficulties and disadvantages.

Another object is to provide an improved device for installing rocket engines at a cant with respect to vertical without imposing excessive asymmetric loading on the nozzle exit of the engine.

It is another object to provide in a device for installing rocket engines, at a cant relative to vertical, an improved coupling for interconnecting a lifting platform for a rocket engine to be installed in rocking relation with a supporting pedestal.

It is another object to provide an improved device for installing rocket engines at a cant with respect to vertical, including a lifting platform for supporting the rocket engine at its thrust chamber exit, without imposing weight penalties on the engine caused by increasing the structural capability for withstanding handling loads.

It is another object to provide in a device for installing rocket engines of the type including a base, an extensible pedestal mounted on the base, a lift platform coaxially related to the pedestal having an annular support for receiving the thrust chamber exit of a rocket engine and an extensible internal probe coaxially related to the pedestal and adapted to be extended into supporting engagement with the internal surface of the thrust chamber, an improved coupling for interconnecting the lift platform in pivotal relation with the pedestal, whereby rocking motion of the lift platform relative to the pedestal is accommodated.

These and other objects and advantages are achieved through the use of a bearing mount of a concave configuration concentrically related to the lifting platform and a seat of a convex configuration affixed to a pedestal for receiving the mount in sliding engagement, as will become more readily apparent by reference to the following descriptions and claims in light of the accompanying drawings.

BRIEF DESCRIPTION OF THE DRAWINGS

FIG. 3 is an enlarged, fragmented, partially sectioned view of the device illustrating mated bearing surfaces for supporting a lift platform at the distal end of a supporting pedestal.

FIG. 4 is a fragmented, enlarged, partially sectioned view of the mated bearing surfaces.

FIG. 5 is a bottom plan view of the lift platform illustrating the concave bearing provided therefor.

FIG. 6 is a top plan view of a collar having a convex bearing surface adapted to mate with the concave bearing surface.

DESCRIPTION OF THE PREFERRED EMBODIMENT

Figure 1:
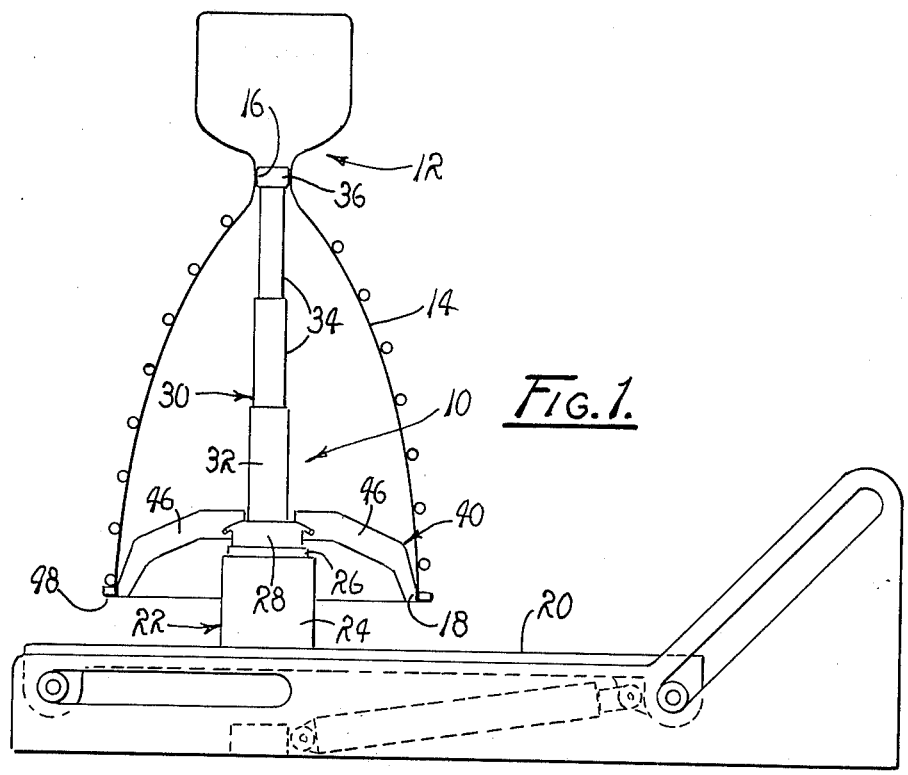
FIG. 1 is a diagrammatic view illustrating the device of the instant invention, as it is configured for supporting a rocket engine in a vertical orientation.

Referring now to the drawings wherein like reference characters designate like or corresponding parts throughout the several views, there is shown in FIG. 1 a device, generally designated 10, which embodies the principles of the instant invention.

As illustrated in the drawings, the device 10 is particularly suited for use in supporting a rocket engine during the installation thereof utilizing known procedures which require the engine to be supported at a severe cant relative to vertical. For illustrative purposes, the device 10 is shown disposed in supporting relation with a rocket engine 12 having a thrust chamber 14, a throat 16, and a thrust chamber exit 18.

The device 10 is mounted on a tiltable table, generally designated 20, which is supported for pivotal motion about one end thereof. Since the tilting table and the actuator structure provided for tilting the table 20 form no specific part of the instant invention, a detailed description thereof is omitted in the interest of brevity. However, it is to be understood that the table 20 serves to support the device 10 so that the device is supported for angular motion adequate for facilitating an installation of a rocket engine at a severe cant. Of course, the table is pivotally connected in any suitable manner to a base, not designated, and pivotally displaced through the use of slave cylinders, cables, winches and similar devices, also forming no part of the instant invention.

Mounted on the table 20 there is a normally related, axially extensible pedestal 22. As shown, the pedestal 22 includes a base segment 24 suitably affixed to the table 20, an intermediate segment 26 telescopically received by the segment 24 and a distal segment 28 telescopically received by the intermediate segment 26. Suitable fluid pressurization circuits, not shown, are provided for pressurizing the pedestal 22 for effecting a telescopic extension and retraction of the pedestal through axial displacement of the segments thereof.

Affixed to the segment 28, and extended therefrom in coaxial alignment with the pedestal 22, there is a telescopically extensible probe, designated 30. The probe 30 is connected with the pedestal through a use of suitable screws, not designated. The probe 30 is similar in design to the pedestal 22 and includes a base segment 32 integrally connected to the distal segment of the pedestal 22, an intermediate segment 34 telescopically received by the base segment 32, and a distal segment 34 having provided at its distal end a head 36. The head 36 is suitably configured to be received in friction-fit engagement with the internal surfaces of the throat 16 of the rocket engine 12.

It also is to be understood that the probe 30 is connected with a source of pressurized fluid through a fluid circuit, not shown, which serves to extend and retract the probe in telescopic fashion. Since the circuitry provided for extending and retracting the probe 30 forms no specific part of the instant invention, a detailed description thereof is omitted in the interest of brevity. However, it is to be understood that, where so desired, the probe 30 is, in operation, telescopically extended and retracted independently of the pedestal 22.

Mounted on the pedestal 22 in fixed relation with the distal segment 28 thereof, there is provided a lifting platform, generally designated 40, which serves to receive in supporting relation the rocket engine 12. As best illustrated in FIG. 5, the lifting platform 40 includes a concentric bearing mount 42 having a bearing surface 44 conforming in its configuration to that of a segment of a sphere. While the radius of the bearing surface 44, where so desired, is determined empirically, it is to be understood that it is sufficient to provide a suitable bearing surface for supporting the lifting platform 40.

From the bearing mount 42 there is radially extended a plurality of uniformly spaced legs 46 terminating in an annular receiver 48 having a diameter substantially equal to the diameter of the exit of the thrust chamber 14. Additionally, where desired, a plurality of locking devices 50, including manipulatable clamps, are provided for securing the thrust chamber 14, at the periphery of its exit 18, to the receiver 48. It should, in view of the foregoing, be readily apparent that the rocket engine 12 is supported by the lifting platform 40 which is, in turn, supported by the pedestal 22.

In order to couple the lifting platform 40 with the pedestal 22, the pedestal is provided with an annular collar 52 having a bearing surface 54 mated in supporting relation with the bearing surface 44. The surface 54 also conforms in its configuration to that of a segment of a sphere with the radius thereof being substantially equal to the radius of the bearing surface 44. The annular collar 52 is connected to the pedestal 22, in concentric relation therewith, through an annular bracket 56 integrally related with the distal end of the distal segment 28 and secured to the collar by suitable means including an array of screw-threaded bolts 58 received within bores suitably formed in the collar.

The mated bearing surfaces 44 and 54 of the bearing mount 42 and the annular collar 52, respectively, accommodate sliding motion therebetween. Thus the lifting platform 40 is supported for pivotal motion about an infinite number of axes angularly related to the longitudinal axis of the pedestal 22.

The thus accommodated pivotal motion of the platform 40, relative to the pedestal 22, serves to assure that the thrust chamber exit 18 is uniformly loaded as the rocket engine 12 is canted with respect to vertical, while the engine is supported concurrently by the extensible probe 30, the head 36 of which is seated in the throat 16.

OPERATION

It is believed that in view of the foregoing description, the operation of the device will readily be understood and it will be briefly reviewed at this point.

With the device 10 assembled in the manner hereinbefore described, the pedestal 22 and the probe 30 are telescopically retracted into compact configurations, with the table 20 being extended in a substantially horizontal plane. A rocket engine 12 in its inverted configuration is seated on the receiver 48 and secured in place through the plurality of locking devices 50.

Figure 2:
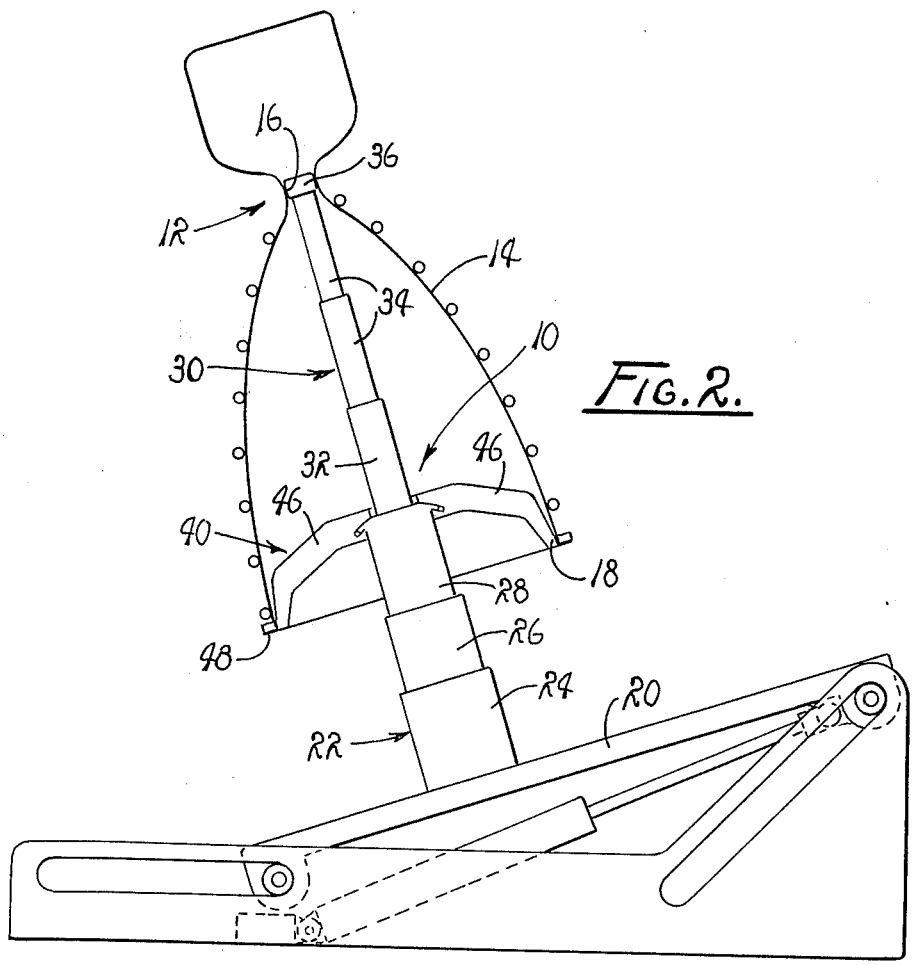
FIG. 2 is a diagrammatic view of the device shown in FIG. 1, illustrating the configuration assumed by the device when supporting a rocket engine for installation at a cant relative to vertical.

As illustrated in FIG. 1, the extensible probe 30 now is extended sufficiently for causing the head 36 to enter and seat in frictional engagement with the internal surfaces of the throat 16 of the rocket engine. The engine is then canted to a predetermined angle, 18° for example, with respect to vertical by tilting the table 20, as illustrated in FIG. 2. The center of gravity of the engine now is caused to shift and act at an angle with respect to the longitudinal or thrust axis of the engine 12. Of course, it is substantially impossible to achieve infinite rigidness in the fabrication of the device 10. As a consequence, deflection of the probe 30 occurs in response to the effects of the shift of the center of mass. However, the thrust chamber exit 18 remains uniformly loaded due to the sliding motion of the bearing surface 44 of the bearing mount 42 along the bearing surface 54 of the annular collar 52. The lifting platform 40 thus experiences a rocking motion about an axis angularly related to the longitudinal axes of the pedestal 22 so that a reactive load is applied to the thrust chamber exit 18, at the uppermost portion thereof, as the lowermost portion of the receiver 48 experiences loading. Consequently, asymmetric loading on the thrust chamber exit 18 is avoided.

Finally, in order to complete installation, the pedestal 22 is extended for finally axially advancing the rocket engine 12 into a received disposition for final installation.

In view of the foregoing, it should readily be apparent that the device 10 of the instant invention provides a practical solution to the perplexing problem of installing rocket engines of substantial mass while the engine is supported in a canted relation relative to vertical.

Although the invention has been herein shown and described in what is conceived to be the most practical and preferred embodiment, it is recognized that departures may be made therefrom within the scope of the invention, which is not to be limited to the illustrative details disclosed.

I claim:

1. In a device for installing rocket engines of the type including a base, an extensible pedestal mounted on the base, a lift platform coaxially related to the pedestal having an annular support for receiving the thrust chamber exit of a rocket engine, and an extensible internal probe coaxially related to said pedestal and adapted to be extended into supporting engagement with the internal surface of the thrust chamber of the rocket engine, the improvement comprising:

coupling means for interconnecting said platform in pivotal relation with said pedestal;
said coupling means including a first bearing means affixed to said platform and defining a bearing mount of a concave configuration;
second bearing means affixed to said pedestal including a bearing surface defining a seat of a convex configuration for receiving said mount.

2. The improvement of claim 1 wherein each of said bearing surfaces is of a configuration conforming to a segment of a sphere.

3. The improvement of claim 2 wherein said second bearing means includes a collar of an annular configuration mounted on said pedestal in concentric relation therewith and said first bearing means includes an annular base seated on said second bearing means in sliding engagement therewith.

4. The improvement of claim 3 wherein said platform is characterized by an annular array of uniformly spaced legs extended radially from said annular base and an annular receiver concentrically related to said annular base for receiving in supporting relation an exit chamber.

5. A device for installing rocket engines comprising:
A. a tiltable table;
B. an axially extensible pedestal mounted on said table and extended therefrom;
C. a lifting platform for supporting the thrust chamber exit of a rocket engine to be installed in supported relationship, including a mount having an annular base characterized by a concave bearing surface, a plurality of uniformly spaced legs extended radially from said base, and an annular receiver coaxially aligned with said annular base affixed to the distal ends of said legs for receiving said chamber exit;
D. coupling means for joining said pedestal with said lifting platform including a seat of an annular configuration concentrically related to said pedestal and affixed to the extended end portion thereof having a convex bearing surface disposed in sliding engagement with the concave bearing surface of said annular base; and
E. an axially extensible probe mounted on said pedestal in coaxial alignment therewith having an end portion adapted to be extended into supporting engagement with the internal surface of the throat of the rocket engine to be installed.

6. The device in claim 5 wherein each of said bearing surfaces is of a configuration conforming to a segment of a sphere.

* * * * *